Patented Jan. 23, 1951

2,539,193

UNITED STATES PATENT OFFICE 2,539,193

VAT DYESTUFFS

Walter Kern, Sissach, Switzerland, assignor to Ciba Limited, Basel, Switzerland, a Swiss firm No Drawing. Application March 8, 1949, Serial No. 80,325. In Switzerland March 16, 1948

6 Claims. (Cl. 260—316)

It is known to subject reaction products of 5:8-dihalogen-1:2-benzanthraquinones with aminoanthraquinones to the action of carbazolizing agents (see German Patent No. 536,294, French Patent No. 696,011, British Patent No. 335,014 and United States Patent No. 1,923,227). The starting materials used in these patents are derived from 1-aminoanthraquinone and aminoanthraquinones which contain as substituents in α-position acylamino groups, especially benzoylamino groups. The dyestuffs obtained by these known processes dye brown tints.

According to the present invention valuable vat dyestuffs are made by treating a product of the general formula in which R represents the radical of a 1:1'-dianthrimide linked to the —NH-groups in 4-position and the Bz-nucleus may be halogen-substituted, with a carbazolizing agent of the type of aluminum chloride.

The products of the above formula used as starting materials in the present invention can be obtained in a simple manner, on the one hand, from 5:8-dihalogen-1:2-benzanthraquinones, advantageously from 5:8-dibromo- or more especially 5:8-dichloro-1:2-benzanthraquinone, and, on the other, from 1:1'-dianthrimides which are substituted by an amino group in 4-position, if desired, with the addition as an agent assisting the reaction in known manner of copper or a copper salt such as copper acetate. Especially advantageous results are obtained by using starting materials which are derived from 4-amino-1:1'-dianthrimides containing no or only few further substituents, especially 4-amino-1:1'-dianthrimide itself.

Especially valuable dyestuffs are obtained by using starting materials which are halogen-substituted in the Bz-nucleus. Such starting materials are obtained in a simple manner by halogenating the corresponding halogen-free products, for example, with the use of brominating or chlorinating agents such as bromine or especially sulfuryl chloride. A difference as compared with the halogen-free products can already be observed when the halogenation is such as to introduce less than one halogen atom into the dyestuff. However, the halogenation may proceed to the stage at which more than one, for example, about two halogen atoms, especially chlorine atoms, are introduced into the molecule.

The treatment of the above described starting materials with carbazolizing agents of the type of aluminum chloride is advantageously conducted in a solvent or dispersing medium, advantageously in the presence of a tertiary base such as pyridine or a homologue of pyridine. The products can be worked up in the usual manner. In some cases it is of advantage after the carbazolization to subject the dyestuff to vatting and then to regenerate the dyestuff by treatment with an oxidizing agent, for example, by introducing a blast of air.

The dyestuffs so obtained correspond to the general formula in which the Bz-nucleus may with advantage be halogen-substituted and in which other substituents not harmful in vat dyestuffs may be present. Among these vat dyestuffs there are especially advantageous those of the above general formula in which no other substituents are present. These dyestuffs are in general distinguished by yielding tints which are moderately or to a considerable extent neutral grey. In view of the fact that a grey tint is the consequence of a dyestuff having a rather uniform absorption curve, and that the majority of all dyestuffs do not exhibit a uniform absorption in the visible region of the spectrum, but show pronounced absorption maxima, it could not be expected that the dyestuffs of the present invention would yield grey tints.

The dyestuffs of the invention are suitable for dyeing and printing a very wide variety of materials, especially vegetable fibers such as cotton, linen and artificial silk and staple fibers of regenerated cellulose. They can be used in the form of the leuco-ester salts (for example, the sulfuric acid salts) obtainable in the usual manner for dyeing and printing by the customary methods for this class of dyestuffs.

The following examples illustrate the invention the parts and percentages being by weight unless otherwise stated and the relationship of parts by weight to parts by volume being the same as that of the kilogram to the liter:

Example 1

2 parts of the condensation product from 1 mol of 5:8-dichloro-2:1-benzanthraquinone and 2 mols of 4-amino-1:1'-dianthrimide and having the formula

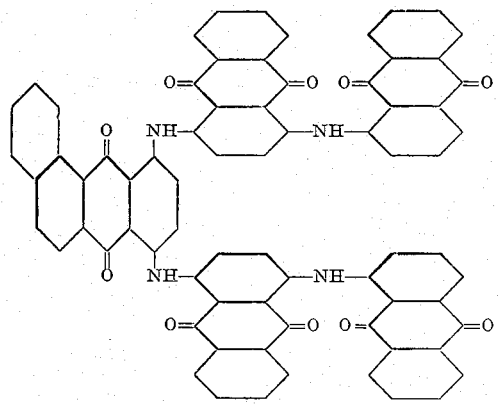

are introduced at 100° C. into a mixture of 8 parts of aluminum chloride and 16 parts of pyridine, and the whole is stirred for 2 hours at 125-130° C. The melt is then poured into water, and the mixture is rendered alkaline with caustic soda solution. The product is vatted with hydrosulfite, the mixture is filtered to remove a small amount of residual matter and air is blown through the dyestuff. It is a dark powder which dissolves in concentrated sulfuric acid with a brown-olive coloration and dyes cotton from a yellow-brown vat fast grey tints of a slight olive shade. The starting material used in this example is prepared as follows:

6.5 parts of 5:8-dichloro-1:2-benzanthraquinone (obtained by subjecting to ring closure the reaction product of naphthalene and 3:6-dichlorophthalic anhydride by treatment with phosphorus pentoxide in ortho-dichlorobenzene as indicated in Example 1 of British Patent No. 332,192), 17.9 parts of 4-amino-1:1'-dianthrimide, 4.4 parts of anhydrous sodium carbonate and 0.4 part of copper acetate in 180 parts of nitrobenzene are maintained at the boil for 8 hours. After cooling, the condensation product which has precipitated in a quantitative yield is separated by filtration, washed and extracted at the boil with dilute hydrochloric acid. It is a green-black crystalline powder, which dissolves in concentrated sulfuric acid with a green-olive coloration. Its nitrogen content is 4.91 per cent. (4.89 per cent. being required by theory).

Example 2

2.5 parts of the condensation product from 1 mol of 5:8-dichloro-1:2-benzanthraquinone and 2 mols of 4-amino-1:1'-dianthrimide are introduced at 100° C. into a melt consisting of 12.5 parts of aluminum chloride and 28 parts of dry pyridine. The temperature is then raised to 140-132° C. while simultaneously distilling a part of the pyridine, and the whole is stirred at that temperature for 1 hour. The reaction mass is then introduced into water, and is rendered alkaline with caustic soda solution and vatted with hydrosulfite. After filtration to remove a small amount of residual matter, air is blown through the dyestuff-solution, and the latter is separated by filtering with suction, washed and dried. It is a dark powder which dissolves in concentrated sulfuric acid with a brown-olive coloration, and dyes cotton from a yellow-brown vat fast grey tints having a slight olive shade.

Practically the same dyestuff is obtained when the portion of the pyridine is first removed from the aluminum chloride-pyridine mixture by distillation, and then the condensation product of 5:8-dichloro-1:2-benzanthraquinone and 4-amino-1:1'-dianthrimide is added at 121-123° C. and the whole is stirred at that temperature for 1 hour. By after-oxidation with sodium bichromate the tint of the dyestuff becomes somewhat browner in shade.

Example 3

The condensation product obtained as described in the last paragraph of Example 1 is subsequently chlorinated, without being isolated, with sulfuryl chloride with an addition of iodine for 16 hours at 65-70° C. Most of the product thus obtained is substituted in its Bz-nucleus. It is then subjected to fusion with aluminum chloride and pyridine at 140° C. as described in the first paragraph of Example 2. A dark powder is obtained which substantially consists of the compound of the formula

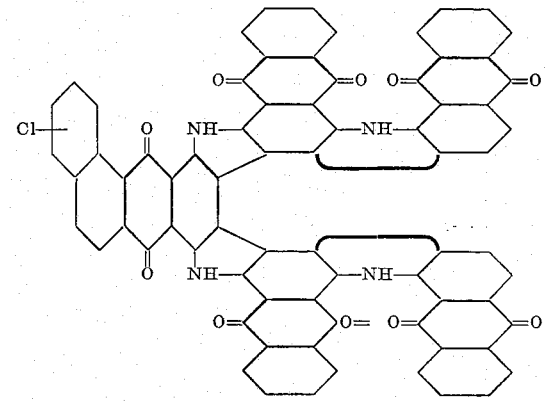

and which dissolves in concentrated sulfuric acid with a brown-olive coloration and dyes cotton from a yellow-brown vat grey tints having excellent fastness properties.

Example 4

By more powerfully chlorinating the condensation product of the last paragraph of Example 1 at a higher temperature 2 atoms of chlorine enter the molecule. By fusing the resulting product with aluminum chloride and pyridine as described in paragraph 1 of Example 2 a dyestuff is obtained which dissolves in concentrated sulfuric acid with a brown-olive coloration and dyes cotton from a yellow-brown vat grey tints of excellent fastness.

Example 5

6.6 parts of 5:8-dichloro-1:2-benzanthraquinone are condensed with 17.8 parts of 4-amino-1:1'-dianthrimide as described in the last paragraph of Example 1 and the reaction mass is cooled to 40° C. Thus, 9.6 parts of bromine and a small (catalytic) quantity of iodine are added and the mixture is stirred at 40–45° C. for 14 hours, then at 65–70° C. for 16 hours. After filtration, washing and boiling with dilute hydrochloric acid a blackish violet powder is obtained which dissolves in concentrated sulfuric acid with an olive-green coloration and has a bromine content of about 6.4 per cent.

5 parts of this product are introduced at 100° C. into a melt consisting of 25 parts of aluminum chloride and 56 parts of anhydrous pyridine. The temperature is then raised to 139–142° C. while distilling a part of the pyridine, and the whole is stirred at that temperature for one hour. The reaction mass is then introduced into water, and is rendered alkaline with caustic soda solution and vatted with hydrosulfite. After filtration to remove a small amount of insoluble matter air is blown through the vat and the dyestuff is suction-filtered, washed and dried. It is a dark powder which corresponds to the formula

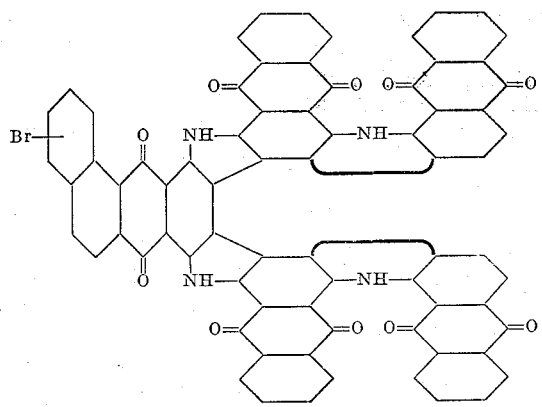

and which dissolves in concentrated sulfuric acid with a dirty greyish brown color and dyes cotton from an orange-brown vat strong and fast grey shades.

Example 6

1.5 parts of the dyestuff obtained as described in Example 3 are vatted in 200 parts of water with 5 parts by volume of caustic soda solution of 36° Bé. and 2.5 parts of sodium hydrosulfite at about 50° C. The resulting stock vat is added to a dyebath which contains in 2800 parts of water 10 parts by volume of caustic soda solution of 36° Bé. and 5 parts of sodium hydrosulfite. 100 parts of cotton are entered at 40° C., 45 parts of sodium chloride are added after 15 minutes, and dyeing is carried on for 1 hour while heating the dyebath up to 50° C. The cotton is then squeezed, oxidized in the air, rinsed and finished in the usual manner. It is dyed a fast grey tint.

It is to be understood that in the appended claims the symbol

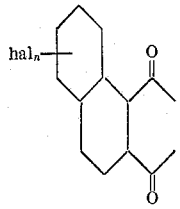

means substitution and not addition of hal for hydrogen atoms otherwise present in the benzene ring, the index $n$ indicating the number of atoms so substituted.

What I claim is:

1. A vat dyestuff of the general formula

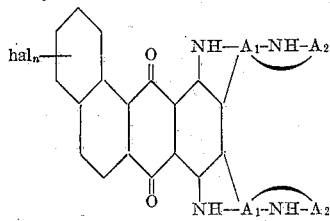

wherein each $A_1$ and each $A_2$ stands for an anthraquinone radical, $A_1$ carrying the NH-groups in 1- and 4-positions, respectively, and the link completing the carbazole ring in 2- and 3-positions, respectively, and $A_2$ carrying the NH-group in 1-position and the link completing the carbazole ring in 2-position, and wherein hal stands for a halogen and $n$ for a number between 0 and 2, inclusive.

2. A vat dyestuff of the general formula

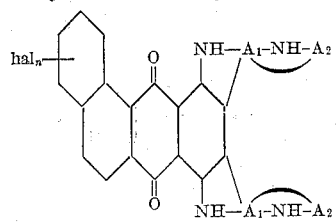

wherein each $A_1$ and each $A_2$ stands for an anthraquinone radical, $A_1$ carrying the NH-groups in 1- and 4-positions, respectively, and the link completing the carbazole ring in 2- and 3-positions, respectively, and $A_2$ carrying the NH-group in 1-position and the link completing the carbazole ring in 2-position, and wherein hal stands for a halogen of an atomic weight between 34 and 82 and $n$ for a number between 0 and 2, inclusive.

3. The vat dyestuff of the formula

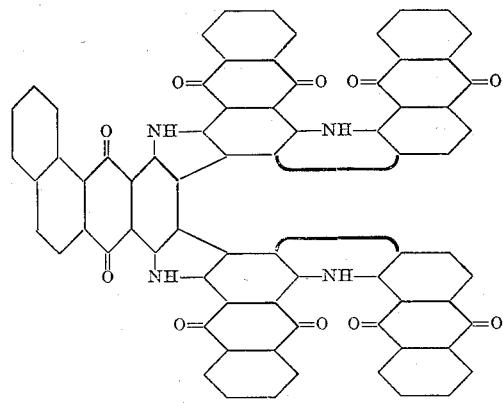

4. The vat dyestuff of the formula

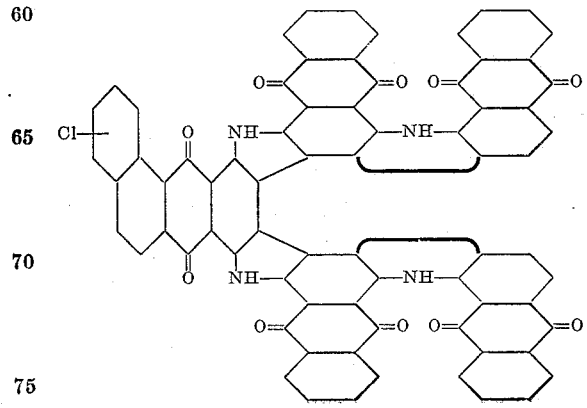

5. The vat dyestuff of the formula
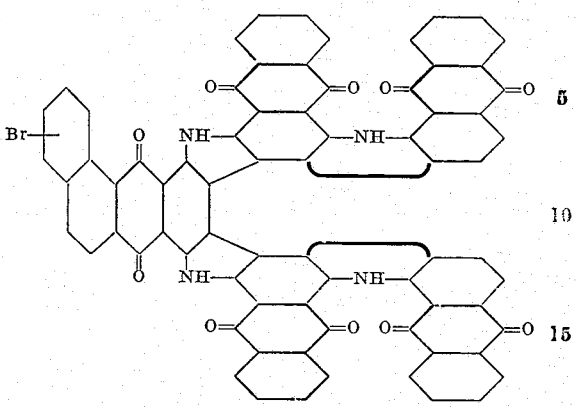
6. The vat dyestuff of the formula
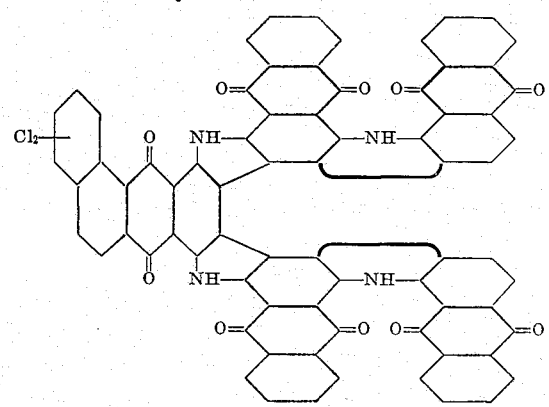
WALTER KERN.
REFERENCES CITED
The following references are of record in the file of this patent:
UNITED STATES PATENTS
| Number | Name | Date |
|---|---|---|
| 1,923,227 | Nawiasky et al. | Aug. 22, 1933 |
| 2,364,456 | Lulek | Dec. 5, 1944 |